United States Patent
Bando

(10) Patent No.: US 7,051,128 B2
(45) Date of Patent: May 23, 2006

(54) SYSTEM AND METHOD FOR DATA BUS COMMUNICATION SYSTEM BETWEEN EXTERNAL CARD CONNECTION DEVICE AND HOST DEVICE

(75) Inventor: Hideaki Bando, Tokyo (JP)

(73) Assignee: Sony Corporation (JP)

( * ) Notice: Subject to any disclaimer, the term of this patent is extended or adjusted under 35 U.S.C. 154(b) by 267 days.

(21) Appl. No.: 10/474,915

(22) PCT Filed: Feb. 19, 2003

(86) PCT No.: PCT/JP03/01800

§ 371 (c)(1),
(2), (4) Date: Oct. 16, 2003

(87) PCT Pub. No.: WO03/071437

PCT Pub. Date: Aug. 28, 2003

(65) Prior Publication Data
US 2004/0172488 A1 Sep. 2, 2004

(30) Foreign Application Priority Data

Feb. 21, 2002 (JP) ............................. 2002-045252

(51) Int. Cl.
*G06F 13/00* (2006.01)
*G06F 17/00* (2006.01)

(52) U.S. Cl. ........................ 710/100; 710/47; 710/264; 710/8; 711/115

(58) Field of Classification Search .................. 710/47, 710/100, 264, 8; 711/115
See application file for complete search history.

(56) References Cited

U.S. PATENT DOCUMENTS 6,470,407 B1 * 10/2002 Losi ........................... 710/264

FOREIGN PATENT DOCUMENTS

| JP | 54-16945 A1 | 2/1979 |
| JP | 56-14329 A1 | 2/1981 |
| JP | 2001-202254 A1 | 7/2001 |

* cited by examiner

*Primary Examiner*—Tammara Peyton
(74) *Attorney, Agent, or Firm*—Lerner, David, Littenberg, Krumholz & Mentlik, LLP

(57) ABSTRACT

This invention is an information processing device such as a computer, as a host device, and a memory card as an external connection device to be connected to the host device. A memory card (1) and a host device (2) are connected with each other in accordance with a six-wire-system half-duplex protocol using four-bit parallel signals, a bus state signal, and a clock signal. When the state of the bus state signal is a state of accepting interruption, the memory card (1) sends an interrupt signal (INT) to four-bit parallel buses. Different elements of interruption are allocated to the respective bits of the four-bit parallel signals. That is, the bit at which the INT signal is sent varies depending on the content of interruption.

18 Claims, 15 Drawing Sheets

| STATE | BUS STATE | EXPLANATION |
|---|---|---|
| BS0 | Low | INT TRANSFER STATE IS USED AS TRANSMISSION LINE FOR INT SIGNAL (INTERRUPT) WHEN PACKET COMMUNICATION IS NOT PERFORMED |
| BS1 | High | TPC STATE MEANS START OF PACKET AND TRANSFER TPC (TRANSFER PROTOCOL COMMAND) FROM HOST TO MEMORY STICK |
| BS2 | Low | AT THE TIME OF READING PROTOCOL<br>HANDSHAKE STATE: WAIT FOR RDY SIGNAL<br>AT THE TIME OF WRITING PROTOCOL<br>DATA TRANSFER STATE: TRANSFER DATA TO MEMORY STICK |
| BS3 | High | AT THE TIME OF READING PROTOCOL<br>DATA TRANSFER STATE: READ DATA FROM MEMORY STICK<br>AT THE TIME OF WRITING PROTOCOL<br>HANDSHAKE STATE: WAIT FOR RDY SIGNAL |

FIG.7

| Address | Register名 | R/W | CONTENTS |
|---|---|---|---|
| 00h | Reserved | — | |
| 01h | INT Register | R | ELEMENT OF INTERRUPTION |
| 02h | Status Register | R | STATUS OF SYSTEM |
| 03h | Reserved | — | |
| 04h | Type Register | R | INTERFACE TYPE |
| 05h | Reserved | — | |
| 06h | Category Register | R | CATEGORY OF MEDIUM |
| 07h | Class Register | R | CLASS OF MEDIUM |
| 08h~FFh | Reserved | — | |

FIG.11

| Address | D7 | D6 | D5 | D4 | D3 | D2 | D1 | D0 |
|---|---|---|---|---|---|---|---|---|
| INT Register 01h | 0<br>CED | 0<br>ERR | 0<br>BREQ/PRG | 0<br>Reserved | 0<br>Reserved | 0<br>Reserved | 0<br>Reserved | 0<br>CMDNK |

FIG. 12

| CED | ERR | BREQ/PRG | CMDNK | OPERATING STATE |
|---|---|---|---|---|
| 1 | 0 | 0 | 0 | NORMAL END |
| 1 | 1 | 0 | 0 | END BY CMD ERROR |
| 0 | 0 | 1 | 0 | DATA REQUEST IN NORMAL STATE |
| 0 | 1 | 1 | 0 | DATA REQUEST IN ERROR STATE |
| 0 | 0 | 0 | 0 | EXECUTING CMD |
| 0 | 1 | 0 | 0 | EXECUTING INTERNAL ERASURE OR FORMATTING |
| 1 | 0 | 0 | 1 | CMD NON-EXECUTABLE (UNACCEPTABLE CMD, UNDEFINED CMD) |

FIG.13

| Address | REGISTER NAME | R/W | CONTENTS |
|---|---|---|---|
| 10h | SystemParameterRegister | W | SET SYSTEM PARAMETER |
| 11h~12h | DataCountRegister1~0/ SystemParameterRegister 1~0 | W | DESIGNATE NUMBER OF DATA TO BE ACCESSED IN EXECUTING MEMORY ACCESS COMMAND, OR MAKE VARIOUS SETTINGS IN EXECUTING SECURITY COMMAND |
| 13h~16h | DataAddressRegister3~0/ RevisionNumberRegister 3~0 | W | DESIGNATE DATA ADDRESS TO BE ACCESSED EXECUTING MEMORY ACCESS COMMAND, OR DESIGNATE REVISION NUMBER IN EXECUTING SECURITY COMMAND |
| 17h | TPCParameterRegister | W | MAKE VARIOUS SETTINGS RELATED TO TPC |
| 18h | CMDParameterRegister | W | MAKE VARIOUS SETTINGS RELATED TO COMMAND |
| 19h~EFf | Reserved | — | |
| F1~FFh | Reserved | — | |

FIG.14

| COMMAND CODE (1 BYTE) | COUNT/SECURITY PARAMETER (2 BYTES) | ADDRESS/REVISION NUMBER (2 BYTES) | CRC (1 Byte) |

FIG.16

| COMMAND NAME | CODE | EXPLANATION |
|---|---|---|
| READ_DATA | 20h | CONTINUOUSLY READ OUT DATA FROM DESIGNATED ADDRESS IN USER AREA |
| WRITE_DATA | 21h | CONTINUOUSLY WRITE DATA TO DESIGNATED ADDRESS IN USER AREA |
| READ_INFO | 22h | CONTINUOUSLY READ OUT DATA |
| WRITE_INFO | 23h | CONTINUOUSLY WRITE DATA |
| READ_ATRB | 24h | READ OUT ATTRIBUTE INFORMATION |
| STOP | 25h | HALFWAY END MEMORY ACCESS PROCESSING BASED ON READ_DATA, WRITE_DATA, READ_INFO, WRITE_INFO, READ_ATRB |
| ERASE | 26h | ERASE DATA FROM DESIGNATED ADDRESS IN USER AREA |

FIG.17

SYSTEM AND METHOD FOR DATA BUS COMMUNICATION SYSTEM BETWEEN EXTERNAL CARD CONNECTION DEVICE AND HOST DEVICE

TECHNICAL FIELD

This invention relates to an external connection device such as an IC memory device connected to an information processing device such as a computer, a host device to which this external connection device is connected, and a data communication system using these external connection device and host device.

This application claims priority of Japanese Patent Application No.2002-045252, filed on Feb. 21, 2002, the entirety of which is incorporated by reference herein.

1. Background Art

Conventionally, as an external storage medium of a host device such as a personal digital assistant, a desktop model computer, a notebook model computer, a portable telephone, an audio device or a home electrical appliance, a removable card-like small IC memory device containing a semiconductor memory that can be inserted into/removed from these devices has been used.

The memory device of this type generally contains a non-volatile semiconductor memory (IC memory) such as a flash memory, and stores various digital data such as static image data, dynamic image data, audio data and music data. This IC memory device functions as an external storage medium of a host device such as a personal digital assistant, a desktop model computer, a notebook model computer, a portable telephone, an audio device or a home electrical appliance.

The operation of such an IC memory device is controlled by the host device via a predetermined interface. Typically, a processing command is transferred from the host device to the IC memory device, thus controlling the operation.

The access speed of the flash memory used in the IC memory device is low. Therefore, in order to reduce a data transfer sequence between the host device and the IC memory device, it is effective to prescribe an interrupt request that notifies of the end of processing from the IC memory device side.

2. Disclosure of the Invention

It is an object of the present invention to provide an external connection device that enable solution of the problems of the conventional IC memory device, a host device to which this external connection device is connected, and a data communication system using these external connection device and host device.

It is another object of the present invention to provide an external connection device and a host device that enable reduction in data transfer processing time between the host device and the external connection device by efficiently providing an interrupt signal from the external connection device to the host device, and a data communication system using these external connection device and host device.

In order to achieve the above-described objects, an external connection device according to the present invention is an external connection device to be connection to a host device, the external connection device comprising: data communication means for performing bidirectional communication of transmission data to and from the host device via a data bus; bus state signal receiving means for receiving a bus state signal indicating the state of the data bus from the host device; and a controller for controlling the operation of this device in accordance with an operation control command included in the transmission data; wherein when the state of the bus state signal is a state of accepting interruption from this device to the host device, the data communication means sends, to the host device via the data bus, information indicating the content of an element of interruption generated on the basis of the operation control command provided to the controller from the host device.

In the external connection device according to the present invention, when the state of the bus state signal is a state of accepting interruption from this device to the host device, information indicating the content of an element of interruption generated on the basis of the operation control command provided from the host device to the controller is sent as an interrupt signal to the host device via the data bus.

A host device according to the present invention is a host device to which an external connection device is connected, the host device comprising: data communication means for performing bidirectional communication of transmission data to and from the external connection device via a data bus; bus state signal sending means for sending a bus state signal indicating the state of the data bus to the external connection device; and a controller for issuing a control command for controlling an operation of the external connection device, the control command being included in the transmission data; wherein when the state of the bus state signal is a state of accepting interruption from the external connection device to this device, the data communication means receives, from the external connection device via the data bus, information indicating the content of an element of interruption generated on the basis of the operation control command provided from this device to the external connection device.

In the host device according to the present invention, when the state of the bus state signal is a state of accepting interruption from the external connection device to this device, information indicating the content of an element of interruption generated on the basis of the operation control command provided from this device to the external connection device is received from the external connection device via the data bus.

The other objects of the present invention and specific advantages provided by the present invention will be further clarified by the following description of an embodiment referring to the drawings.

BRIEF DESCRIPTION OF THE DRAWINGS

FIG. 7 is a view for explaining the content of communication in each state.

FIG. 11 is a view showing internal registers constituting a status register group.

FIG. 12 is a view showing the content of bits within an INT register.

FIG. 13 is a view showing an operating state of the memory card corresponding to each bit value within the INT register.

FIG. 14 is a view showing internal registers constituting a parameter register group.

FIG. 16 is a view showing transfer data in the case of EX_SET_CMD_TPC.

FIG. 17 is a view showing exemplary control commands.

BEST MODE FOR CARRYING OUT THE INVENTION

Hereinafter, an embodiment will be described in which the present invention is applied to a removable small IC memory device and a data processing device using this small IC memory device as an external storage medium.

In the following description, the small IC memory device is referred to as memory card, and the data processing device to which this memory card is connected is referred to as host device.

First, the overview of the host device to which the present invention is applied and the memory card to be connected to this host device will be described with reference to FIG. 1.

A memory card 1 according to the present invention has a non-volatile semiconductor memory (IC memory) therein and can store various digital data such as static image data, dynamic image data, audio data and music data. This memory card 1 functions as an external storage medium of a host device 2 such as a personal digital assistant, a desktop model computer, a notebook model computer, a portable telephone, an audio device or a home electrical appliance.

Figure 1:
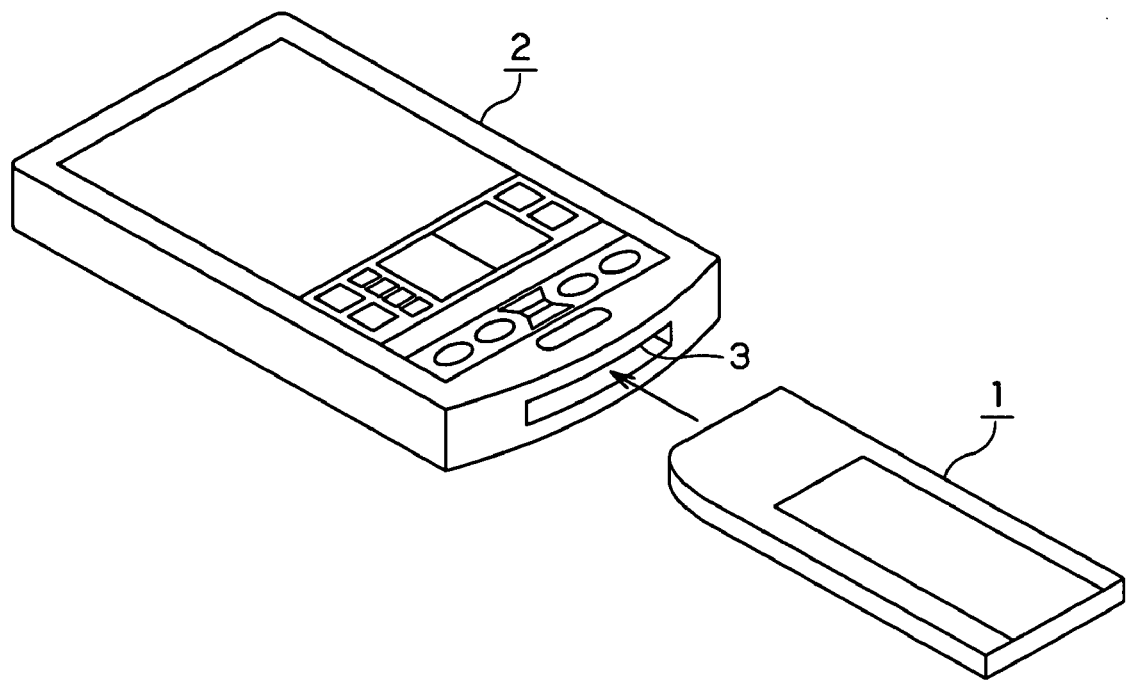
FIG. 1 is a perspective view showing a memory card to which the present invention is applied and a host device using this memory card.

The memory card 1 is used as it is inserted in an insertion/ejection port 3 provided in the host device 2, as shown in FIG. 1. A user can freely insert and remove the memory card 1 to and from the insertion/ejection port 3. Therefore, the memory card 1 inserted in a certain host device can be removed therefrom and inserted into another host device. That is, this memory card 1 can be used for transfer data between different host devices.

The memory card 1 and the host device 2 transfer data via a parallel interface using a six-wire-system half-duplex parallel protocol for transferring six signals, that is, four-bit parallel data, a clock signal and a bus state signal.

Figure 2:
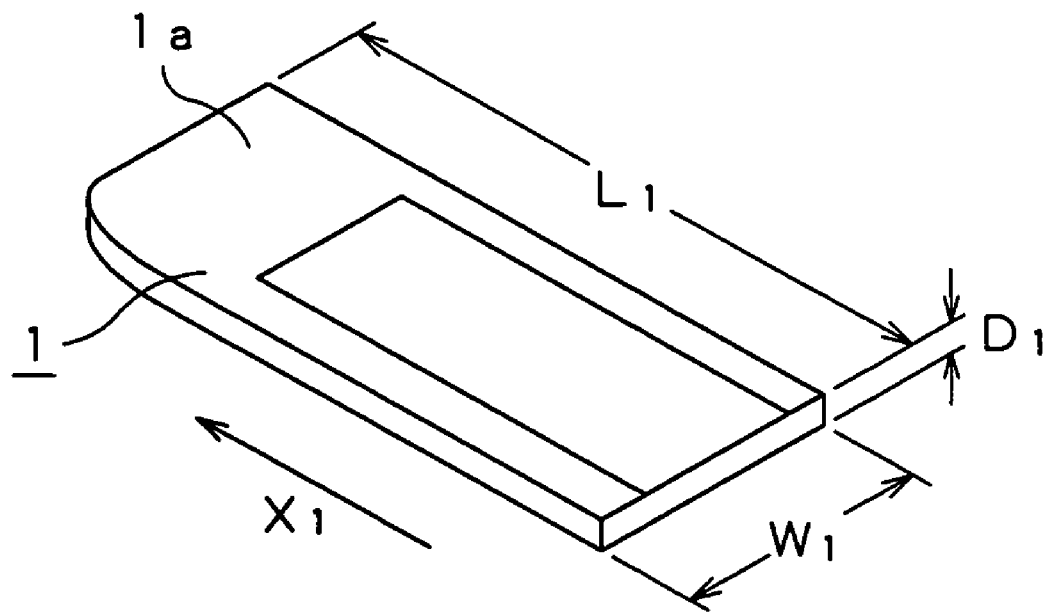
FIG. 2 is a perspective view showing a memory card from its face side.
Figure 3:
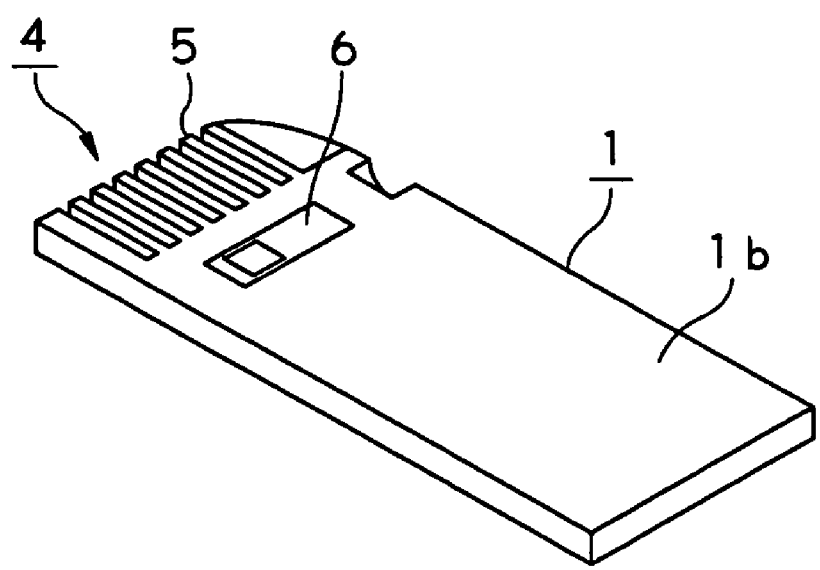
FIG. 3 is a perspective view showing the memory card from its back side.

The memory card 1 is formed in a substantially rectangular thin plate-like shape, as shown in FIG. 2. It has a length $L_1$ of 50 mm in the longitudinal direction, a width $W_1$ of 21.45 mm, and a thickness $D_1$ of 2.8 mm. One side of the memory card 1 is a face side 1a and the other side is a back side 1b. On the back side 1b on one end side in the longitudinal direction of the memory card 1, a connection terminal group 4 constituted by ten flat electrodes is provided, as shown in FIG. 3. The electrodes constituting the connection terminal group 4 are provided in parallel in the direction of the width of the memory card 1. Between the electrodes, partition pieces 5 rising vertically from the back side 1b are provided. Each partition piece 5 is for preventing a connection terminal connected to each electrode from contacting the other electrodes. At a central part on the one end side of the back side 1b of the memory card 1, a slide switch 6 for inhibiting erroneous erasure is provided, as shown in FIG. 3.

In the host device 2 in which the above-described memory card 1 is loaded, the insertion/ejection port 3 for inserting and ejecting the memory card 1 is provided. The insertion/ejection port 3 is formed as an opening corresponding to the width $W_1$ and the thickness $D_1$ of the memory card 1, on the front side of the host device 2, as shown in FIG. 1. The memory card 1 inserted in the host device 2 through the insertion/ejection port 3 is held in the host device 2 and prevented from slipping off as the connection terminals of the host device 2 are connected to the electrodes constituting the connection terminal group 4. The connection terminal of the host device 2 has ten contacts corresponding to the electrodes constituting the connection terminal group 4 provided on the memory card 1 to be loaded.

In the memory card 1 according to the present invention, one side where the connection terminal group 4 is provided is an insertion end, and the direction of an arrow X1 in FIG. 2 is the direction of insertion. The memory card 1 is thus loaded into the host device 2 through the insertion/ejection port 3. The memory card 1 loaded in the host device 2 is enabled to transmit and receive signals when the electrodes constituting the connection terminal group 4 and the contacts of the connection terminal of the host device 2 are connected with each other.

Figure 4:
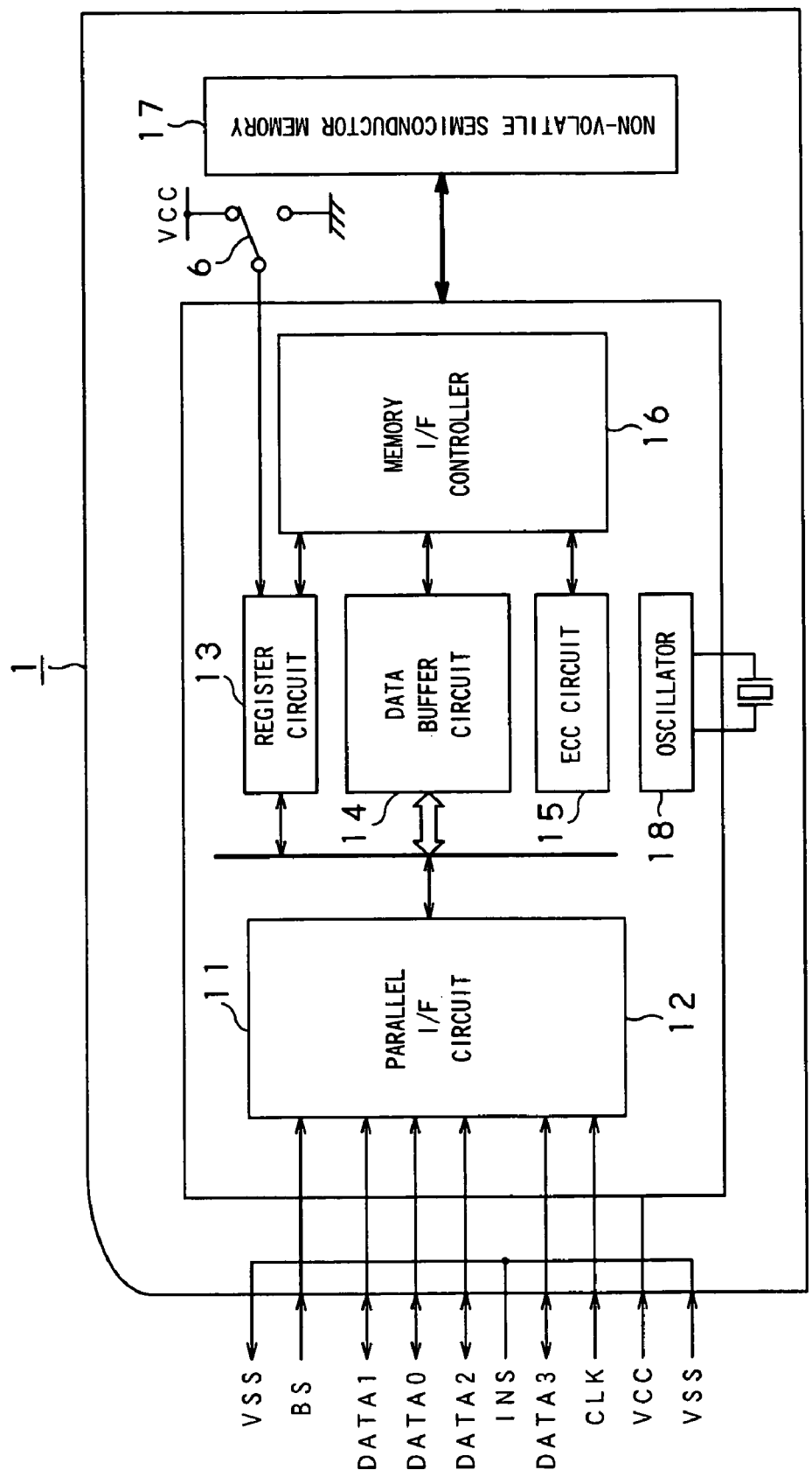
FIG. 4 is a block diagram showing an internal block structure of the memory card.

The internal structure of the memory card 1 according to the present invention will now be described with reference to FIG. 4.

The memory card 1 according to the present invention has a parallel interface circuit (I/F) 12, a register circuit 13, a data buffer circuit 14, an ECC circuit 15, a memory I/F controller 16, a non-volatile semiconductor memory 17, and an oscillation control circuit 18, as shown in FIG. 1.

The parallel I/F circuit 12 is a circuit for transferring data to and from the host device 2, using a six-wire-system half-duplex data transfer protocol.

The register circuit 13 is a circuit for storing, for example, an operation control command to the memory I/F controller 16 transferred from the host device (hereinafter, this operation control command is referred to as control command), the internal state of the memory card 1, various parameters necessary for executing the control command, file management information in the non-volatile semiconductor memory 17, and so on. This register circuit 13 is accessed by both the host device 2 and the memory I/F controller 16. The host device 2 accesses the register circuit 13, using a transfer protocol command (hereinafter referred to as TPC) prescribed on the data transfer protocol of this memory card. That is, when the host device 2 writes or reads out the control command and various parameters stored in the register circuit 13, the host device 2 uses a TPC.

The data buffer circuit 14 is a memory circuit for temporarily saving data to be written to the non-volatile semiconductor memory 17 and data read out from the non-volatile semiconductor memory 17. That is, when data is written to the non-volatile semiconductor memory 17 from the host device 2, write target data is transferred from the host device 2 to the data buffer circuit 14 in accordance with the data transfer protocol and then the memory I/F controller 16 writes the write target data stored in the data buffer circuit 14 to the non-volatile semiconductor memory 17. When data is read out from the non-volatile semiconductor memory 17 to the host device 2, the memory I/F controller 16 reads out read target data from the non-volatile semiconductor memory 17 and temporarily stores the read target data to the data buffer circuit 14, and then the read target data is transferred from the data buffer circuit 14 to the host device 2 in accordance with the data transfer protocol.

The data buffer circuit 14 has a data capacity for a predetermined data writing unit (for example, 512 bytes, which is the same as the page size of the flash memory). The host device 2 accesses the data buffer circuit 14, using a TPC. That is, when the host device 2 writes or reads out data stored in the data buffer circuit 14, the host device 2 uses a TPC.

The ECC circuit 15 appends an error correcting code (ECC) to data to be written to the non-volatile semiconductor memory 17. The ECC circuit 15 also performs error correction processing of data read out from the non-volatile semiconductor memory 17 on the basis of an error correcting code appended to this read-out data. For example, an error correcting code of three bytes is appended to a data unit of 512 bytes.

The memory I/F controller 16 performs control of data transfer between the data buffer circuit 14 and the non-volatile semiconductor memory 17, control of data security management of the non-volatile semiconductor memory 17, control of the other functions of the memory card 1, update processing of the data stored in the register circuit 13, and so on, in accordance with control commands stored in the register circuit 13.

The non-volatile semiconductor memory 17 is a non-volatile semiconductor memory such as a NAND-type flash memory. The capacity of the non-volatile semiconductor memory 17 is, for example, 16 megabytes, 32 megabytes, 64 megabytes, or 128 megabytes. In the non-volatile semiconductor memory 17, an erasure block unit consists of, for example, 16 kilobytes. A reading/writing unit is referred to as page and consists of 512 bytes as in the data buffer circuit 14. The oscillation control circuit 18 generates an operation clock in this memory card 1.

As the connection terminals of the memory card 1, VSS terminals, a VCC terminal, a DATA0 terminal, a DATA1 terminal, a DATA2 terminal, a DATA3 terminal, a BS terminal, a CLK terminal and an INS terminal are provided. Since two VSS terminals are provided, ten connection terminals in total are provided in the memory card 1. Similar connection terminals are also provided on the host device 2.

The VSS terminals are connected with VSS (reference 0-volt voltage). The VSS terminals connect the ground on the host device side and the ground on the memory card side, and cause the 0-volt reference potentials of the host device and the memory card to coincide with each other. The VCC terminal is supplied with a power-supply voltage (VCC) from the host device.

At the DATA0 terminal, a data signal (DATA0) of the least significant bit of four-bit parallel data transferred between the memory card 1 and the host device 2 is inputted/outputted. At the DATA1 terminal, a data signal (DATA1) of the second least significant bit of four-bit parallel data transferred between the memory card 1 and the host device 2 is inputted/outputted. At the DATA2 terminal, a data signal (DATA2) of the third least significant bit of four-bit parallel data transferred between the memory card 1 and the host device 2 is inputted/outputted. At the DATA3 terminal, a data signal (DATA3) of the fourth least significant bit of four-bit parallel data transferred between the memory card 1 and the host device 2 is inputted/outputted.

At the BS terminal, a bus state signal is inputted from the host device to the memory card. At the CLK terminal, a clock signal is inputted from the host device 2. The INS terminal is used for insertion/ejection detection so that the host device 2 can judges whether the memory card is inserted in the slot or not. The INS terminal of the memory card 1 is connected to the ground and the INS terminal of the host device is pulled up via a resistor.

Next, the functional structure of the interface for transmitting data between the memory card 1 and the host device 2 will be described with reference to FIG. 5.

Figure 5:
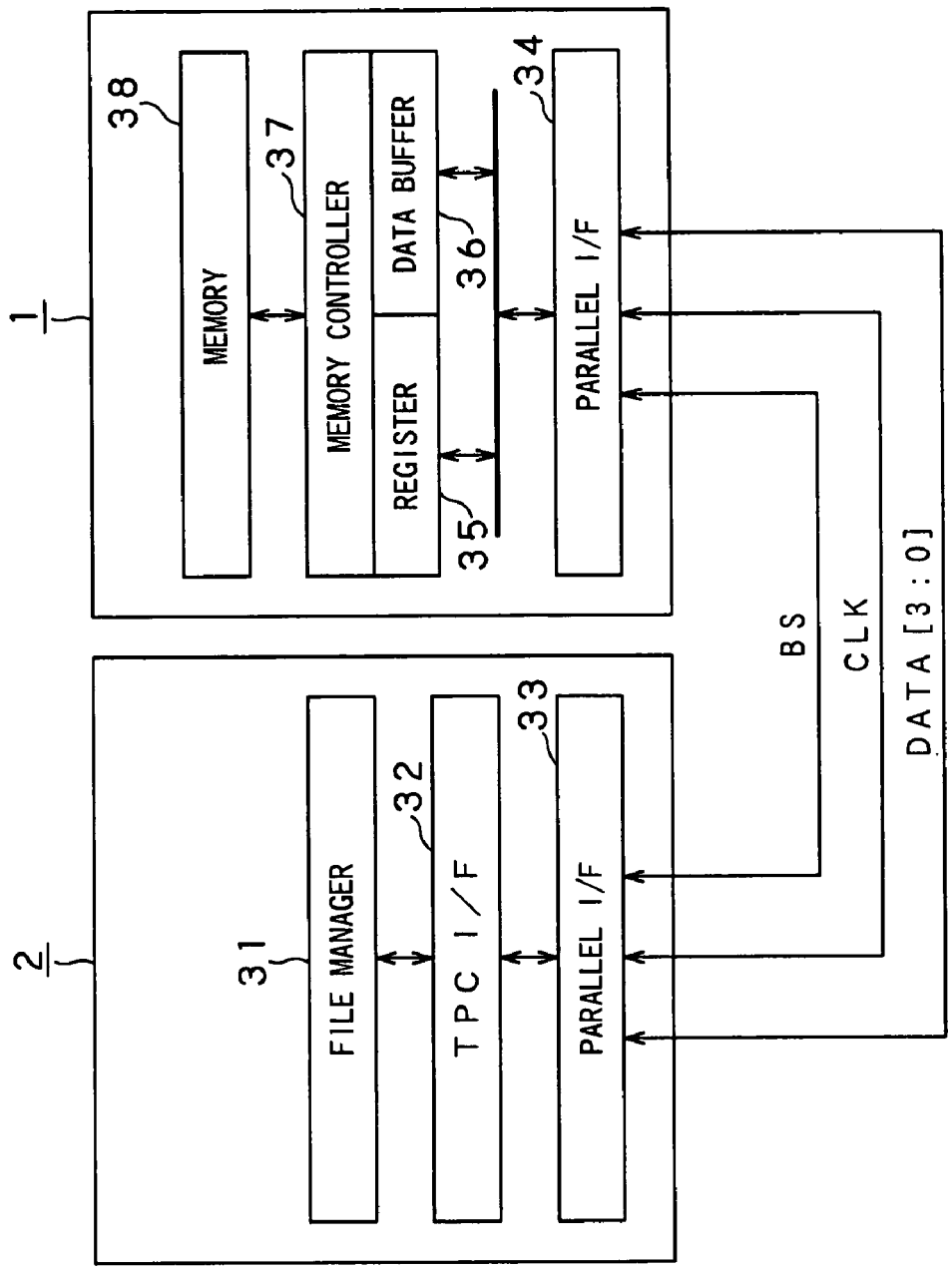
FIG. 5 is a structural view of an interface function for transmitting data between the memory card and the host device.

The interface functions of the host device 2 include a file manager 31, a TPC interface 32, and a parallel interface 33, as shown in FIG. 5. The interface functions of the memory card 1 include a parallel interface 34, a register 35, a data buffer 36, a memory controller 37, and a memory 38.

The file manager 31 manages files stored in the memory card 1 and files stored in other media of the host device, on the operating system of the host device. The file manager 31 is a function realized by the controller or the like in the host device 2.

The TPC interface 32 is a lower layer that is below the file manager 31. The TPC interface 32 accesses the register 35 and the data buffer 36 in the memory card 1 in accordance with a data transfer protocol that prescribes a command proper to this interface (TPC or transfer protocol command). This TPC interface 32 is a function realized by the controller or the like in the host device 2.

The parallel interfaces 33, 34 are lower layers that are below the TPC interface 32. These are physical hierarchical layers of this interface system. The parallel interfaces 33, 34 transfer data in accordance with a six-wire-system half-duplex parallel protocol, which is a data transfer protocol for transferring six signals including four-bit parallel data, a clock and a bus state signal. The parallel interfaces 33, 34 are functions realized by the parallel interface circuit 12.

The register 35 stores control commands transferred from the host, the internal state of the memory card, the address of data to be accessed in the memory 38, various parameters necessary for executing the control commands, file management information in the memory, and so on. The register 35 is a function realized on the register circuit 13 of the memory card 1.

The data buffer 36 is a buffer area for temporarily saving data to be written to the memory 38 and data read out from the memory 38. The data buffer 36 is a function realized on the data buffer circuit 14 of the memory card 1.

The memory controller 37 controls reading, writing and erasure of data between the data buffer 36 and the memory 38, and update of various information in the register 35, in accordance with commands and various information stored in the register 35. The memory controller 37 is a function realized by the memory I/F controller 16 of the memory card 1.

The memory 38 is a memory area for data. The memory 38 is made virtual as a unique model through the memory controller 37. The memory 38 is a function realized by the non-volatile semiconductor memory 17 of the memory card 1.

With the host device and the memory card of the above-described structures, data stored in other media managed by the file manager 31 can be transferred to the memory 38 via the parallel interfaces 33, 34. Also data stored in the memory 38 can be transferred to other media managed by the file manager via the parallel interfaces 33, 34.

The data transfer protocol between the memory card 1 and the host device 2 according to the present invention will now be described.

The features of the data transfer protocol between the memory card 1 and the host device 2 include defining four bus states and identifying the transfer direction and attributes of transmission data, accessing the register circuit 13 and the data buffer circuit 14 of the memory card 1 from the host device 2 using a TPC, controlling the operation of the memory card 1 by the host device 2 using control commands, detecting an error of transfer data between the memory card 1 and the host device 2 using CRC (cyclic redundancy check codes), prescribing an interrupt signal (INT signal) from the memory card 1 to the host device 2, and so on.

Figure 6:
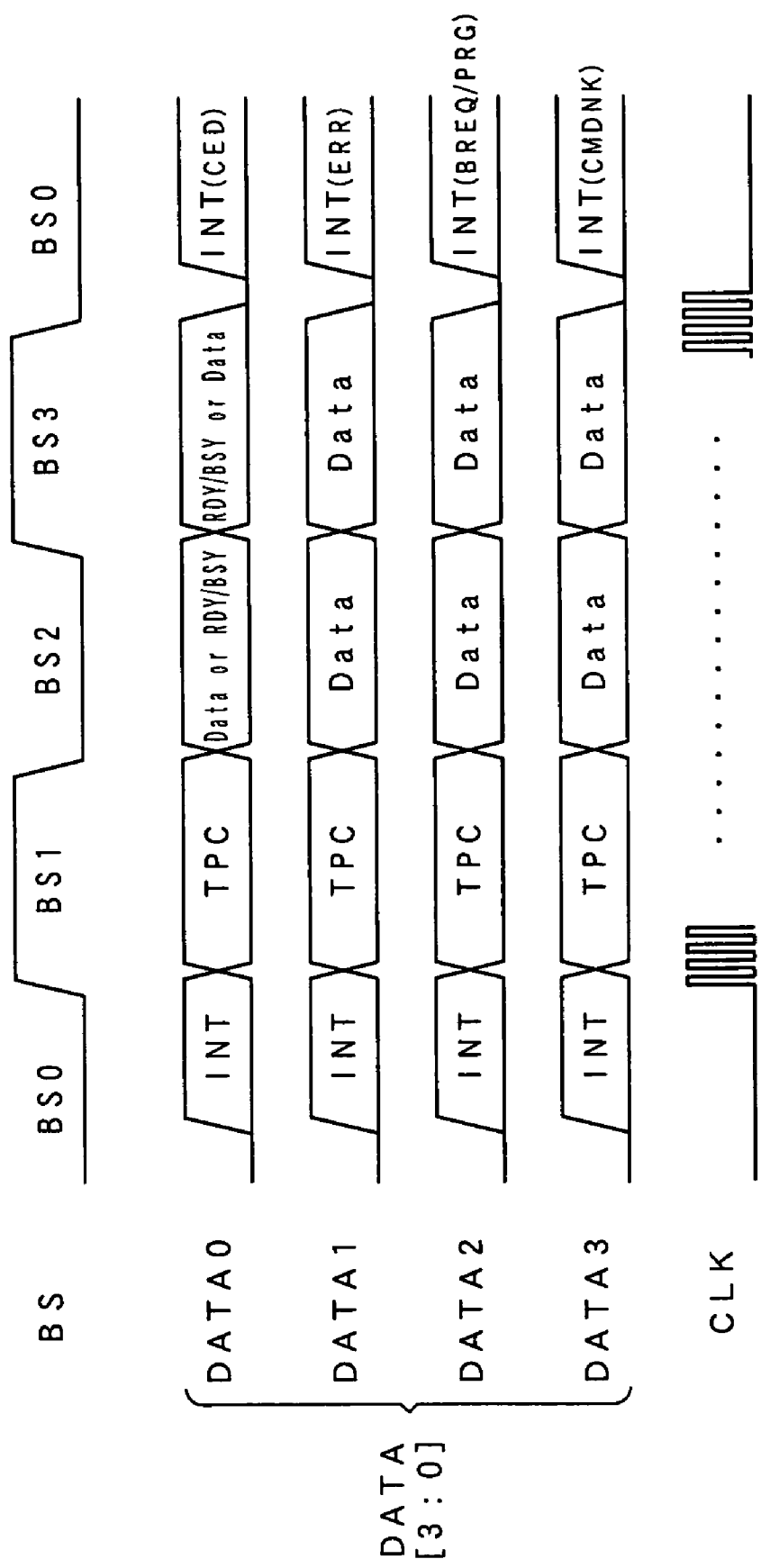
FIG. 6 is a view for explaining a signal transferred between the memory card and the host device.

The memory card 1 and the host device 2 are connected with each other by six signals including a bus state signal (BS), four parallel data signals, and a clock signal (SCLK), as shown in FIG. 6.

The parallel data signals are data signals transferred between the memory card 1 and the host device 2. The parallel data signals transmit parallel data (DATA[3:0]) with a four-bit width, and the transfer direction and attributes of the parallel data (DATA[3:0]) change in accordance with the state prescribed by the bus state signal.

The bus state signal is a signal prescribing the state of the parallel data signals and the transfer start timing for the parallel data signals in each state. This bus state signal is transferred from the host device 2 to the memory card 1. The state is sectioned into four states in total are provided, that is, one state (BS0) in which packet communication is not performed, and three states (BS1 to BS3) in which packet communication is being performed. The bus state signal switches the state from BS0 to BS3 at switching timing of "High" and "Low".

The clock signal is a clock for the parallel data signals and the bus state signal. The clock signal is transferred from the host device to the memory card. The clock signal is necessarily outputted in the three states (BS1 to BS3 ) in which packet communication is being performed.

The contents of communication in each state are as shown in FIG. 7.

BS0 is the state where an interrupt signal (INT signal) from the memory card 1 to the host device 2 can be transferred to the lines of the parallel data signals. The INT signal is transferred asynchronously with the clock. In the state BS0, packet communication is not performed. The signal level of the bus state signal indicating BS0 is expressed as "Low". The operating state of the memory card 1 is reflected on the INT signal, and it will be described later.

BS1 is the state where TPCs are transferred to the lines of the parallel data signals. The signal level of the bus state signal indicating BS1 is expressed as "High". TPCs are transferred from the host device 2 to the memory card 1. TPCs are commands for the host device 2 to access the register circuit 13 and the data buffer circuit 14 of the memory card 1. TPCs include a command for writing or reading data to or from the data buffer circuit 14, a command for writing or reading data to or from the register circuit 13, a command for writing a control command to be given to the memory I/F controller 16 to the register circuit 13, and so on. Specific contents of TPCs and control command will be described later.

In the states BS2 and BS3, the transfer direction and attributes of parallel data (DATA[3:0]) transferred to the parallel data signal lines are different between a write packet for transferring data from the host device 2 to the memory card 1 and a read packet for transferring data from the memory card 1 to the host device 2. The type of a packet, that is, whether a packet is a write packet or a read packet, is decided in accordance with the contents of TPCs transferred in the state BS1.

Figure 8:
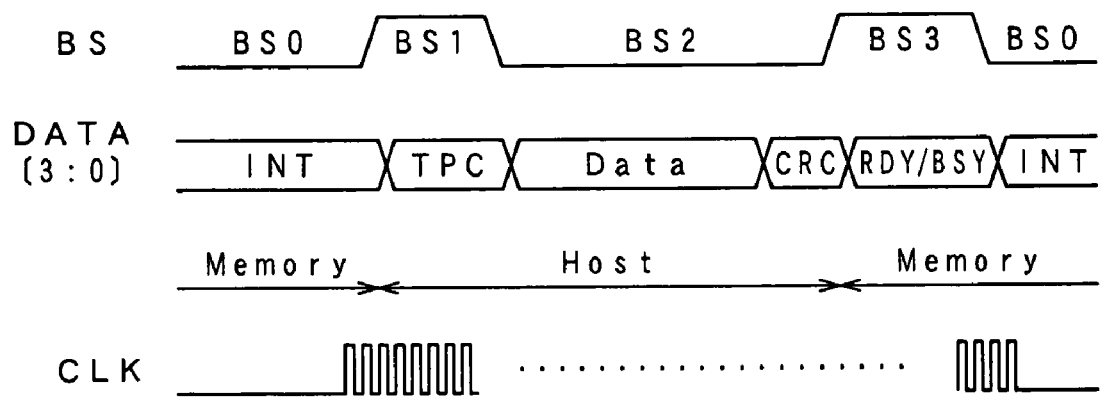
FIG. 8 is a timing chart of parallel data, bus state and clock at the time of transfer of a write packet.

The contents of BS2 an BS3 in the case of a write packet will now be described with reference to FIG. 8, which shows a timing chart for a write packet.

In the state BS2 in the case of a write packet, transfer data on parallel data signals is write target data to the register circuit 13 and the data buffer circuit 14 and a CRC of this write target data. In the state BS2, the transfer data on the parallel data signals is transferred from the host device 2 to the memory card 1.

In the state BS3 in the case of the write packet, transfer data on parallel data signals is a busy (BSY) signal and a read (RDY) signal generated from the memory card 1. In the state BS3 in the case of the write packet, the busy signal and the ready signal on the parallel data signals are transferred from the memory card 1 to the host device 2. In the state BS3 in the case of the write packet, processing of a TPC and transfer data transferred from the host device 2 to the memory card 1 in the states BS1 and BS2 is performed. While the memory card 1 is performing the processing of the TPC and transfer data (that is, when the processing is not completed), the memory card 1 sends the busy signal to the host device 2. On completion of the processing, the memory card 1 sends the ready signal to the host device 2. The busy signal and the ready signal are transferred only to the signal line of the least significant bit (DATA0), of the four parallel data signals. The busy signal is a signal for setting the signal line of the least significant bit (DATA0) at a high level. The ready signal is a signal for switching the level of the signal line of the least significant bit (DATA0) between a high level and a low level alternately and repeatedly by clock. As the busy signal and the ready signal are thus transmitted, a handshake state can be established between the memory card 1 and the host device 2 at the timing of BS3 in the case of the write packet, when data is not being transmitted.

Figure 9:
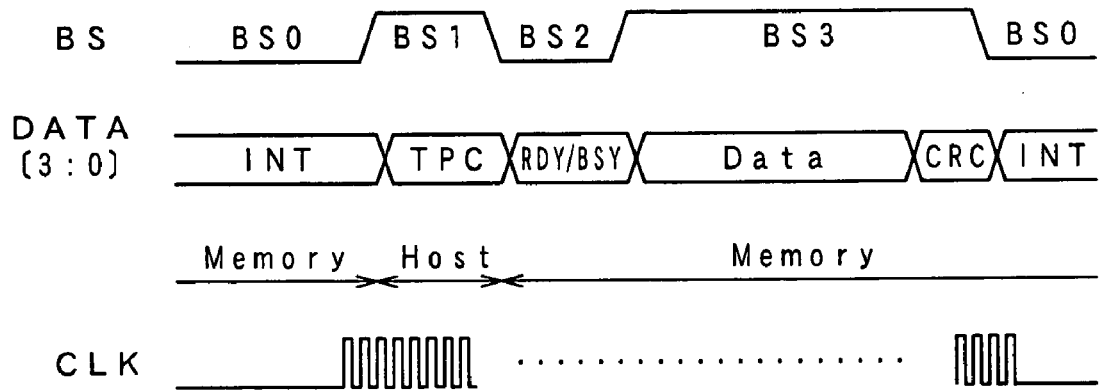
FIG. 9 is a timing chart of parallel data, bus state and clock at the time of transfer of a read packet.

The contents of BS2 and BS3 in the case of a read packet will now be described with reference to FIG. 9, which shows a timing chart for a read packet.

In the state BS2 in the case of a read packet, transfer data on parallel data signals is a busy signal and a ready signal generated from the memory card 1. In the state BS2 in the case of the read packet, the memory card 1 prepares for data transfer in accordance with a TPC transferred from the host device 2 to the memory card 1 in the state BS1. While the memory card 1 is preparing for data transfer with respect to the TPC (that is, when the preparation for transfer is not completed), the memory card 1 sends the busy signal to the host device 2. On completion of the preparation for transfer, the memory card 1 sends the ready signal to the host device 2. As the busy signal and the ready signal are thus transmitted, a handshake state can be established between the memory card 1 and the host device 2 in the state BS2 in the case of the read packet, when data is not being transmitted.

In the state BS3 in the case of the read packet, transfer data on parallel data signals is read target data from the register circuit 13 and the data buffer circuit 14 and a CRC of this read target data. In the state BS3, the transfer data on the parallel data signals is transferred from the memory card 1 to the host device 2.

Figure 10:
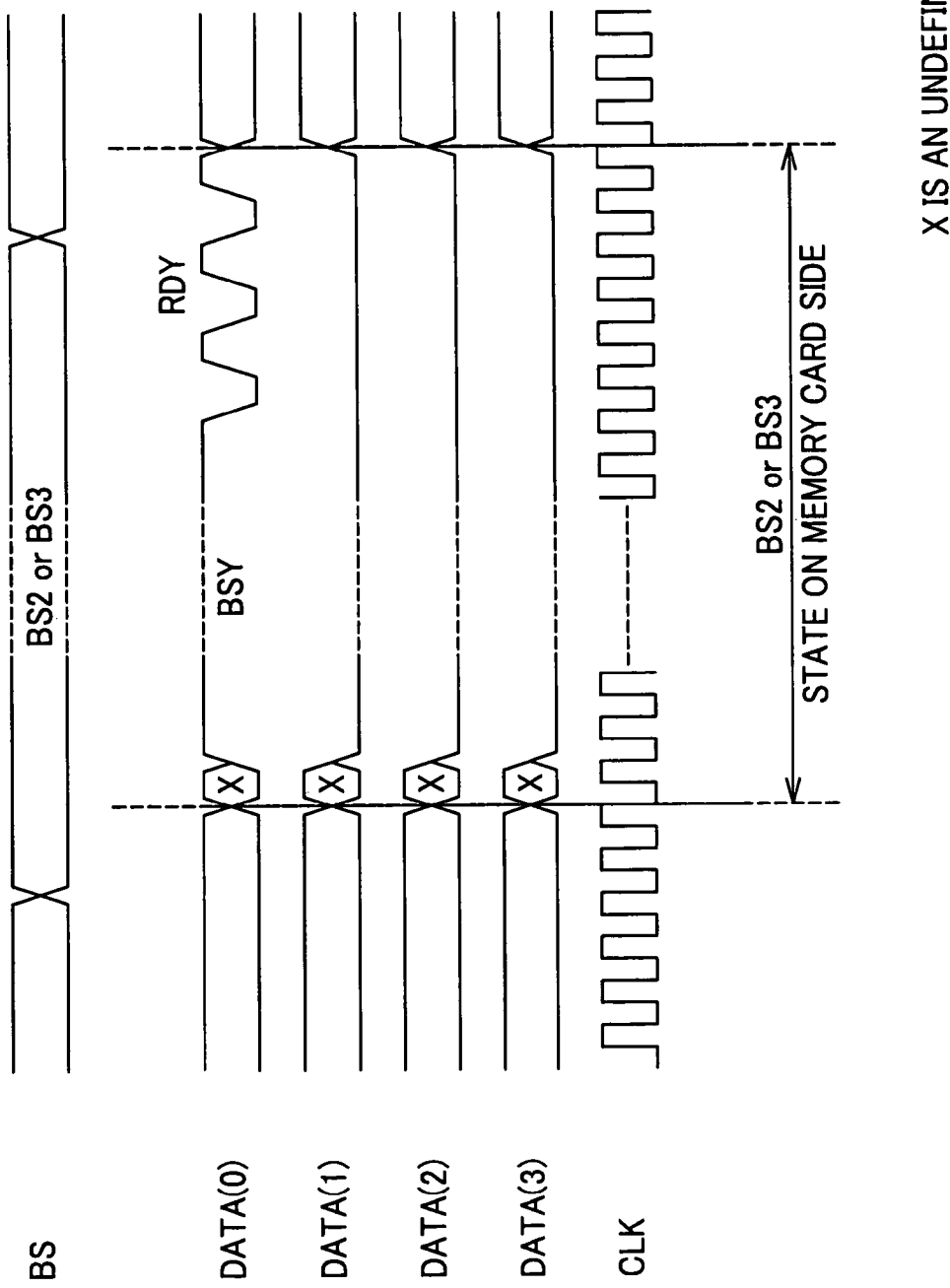
FIG. 10 is a timing chart of a busy signal and a ready signal of a write packet and a read packet.

FIG. 10 shows a detailed timing chart of the busy signal and the ready signal generated in the states BS2 and BS3. As shown in FIG. 10, the busy signal and the ready signal are transferred only to the signal line of the least significant bit (DATA0), of the four parallel data signals. The other bits (DATA1 to DATA3) are set at a low level. The host device 2 receives only the signal transmitted to the signal line of DATA0 and ignores the signals of the other bits. The least significant bit (DATA0) corresponds to the transmission line for serial data in the memory card using the conventional three-wire-system half-duplex protocol. Therefore, the memory card 1 is compatible with a conventional memory card.

Next, an INT signal transferred from the memory card 1 to the host device 2 when the bus state is BS0 will be described.

In the memory card 1, a flash memory is used as the non-volatile semiconductor memory 17. The access time to the flash memory is much longer than the data transfer time between the memory card 1 and the host device 2. Therefore, to reduce the data processing sequence on the side of the host device 2, it is effective to prescribe an interrupt request that notifies of the end of processing or the like from the side of the memory card 1, in consideration of the data transfer protocol. That is, as an interrupt request from the memory card 1 is prescribed, the processing by the CPU on the side of the host device 2 can be made open to other processing while the flash memory is being accessed.

In the state BS0, when a certain interrupt request is generated in the memory card 1, the memory card 1 transfers an interrupt signal (INT signal) to the host device 2. The INT signal is outputted form the memory card 1 asynchronously with a clock signal. In the state BS0, when the bit of one of the signal lines of parallel data (DATA[3:0]) is switched to a high level, it indicates that the interrupt signal is generated from the side of the memory card 1. When all the bits of the parallel data (DATA[3:0]) are at a low level, it is indicated that the memory card 1 is executing processing and that no interrupt request exists.

The interruption generated from the memory card 1 includes plural elements. For example, it includes interruption for notifying the host device 2 of the completion of operation control in response to a control command given to the memory card 1, interruption for notifying the host device 2 of the occurrence of an error when operation control is performed in response to a control command given to the memory card 1, interruption for requesting access to the host device 2, interruption for notifying the host device 2 of information to the effect that a control command given to the memory card 1 is non-executable, and so on.

In the memory card 1, the above-described elements of interruption are allocated to the respective bits of the parallel data (DATA[3:0]) and changes the line that should be at a high level in accordance with generated elements of interruption. That is, an INT signal such that the bit position to be at a high level in the state BS0 varies in accordance with the contents of interruption generated in the memory card 1 is generated from the memory card 1.

In the state BS0, the host device 2 monitors the levels of the respective bits of the parallel data (DATA[3:0]), thus detecting the generation of an interrupt request from the memory card 1, the bit position that is at a high level, and the element of interruption from the memory card 1 at the same time.

On the contrary, in a conventional memory card system, the memory card simply notifies the host side of the presence/absence of an interrupt request. Therefore, even when there is an interrupt request from the memory card, the host side cannot confirm the element of interruption together with the request, and the host side must establish packet communication to read out the element of interruption from the memory card side. However, with the memory card 1 and the host device 2 of the embodiment of the present invention, the elements of interruption are allocated to the bits of the four-bit data lines, respectively. Therefore, the host device 2 can confirm the interrupt request and the element of interruption at the same time.

Therefore, in the present invention, when an interrupt request is generated from the memory card 1, the host device 2 need not carry out packet communication to confirm the contents of the request. In short, the execution time of the data transfer sequence between the memory card 1 and the host device 2 can be reduced.

In this embodiment, the INT signal of the memory card 1 has each bit value stored in an INT register and reflected by the operating state based on a control command. The INT register is provided within a status register group in the register circuit 13. When the bus state signal indicates BS0, the parallel interface circuit 12 of the memory card 1 refers to each bit value of the INT register. If the bit value is valid (1), the data line corresponding to that bit is driven to a high level. If the bit value is invalid (0), the data line corresponding to that bit value is driven to a low level. The specific contents of the INT register and the relation between each value of the INT register and the parallel data (DATA[3:0]) will be described in the following description of the register circuit.

The register circuit 13 will now be described.

The register circuit 13 includes plural internal registers. The internal registers of the register circuit 13 are classified into the following groups 1 to 5 in accordance with the applications:

1. a status register group in which the status of the memory card 1 and the like is stored;
2. a parameter register group in which parameters used for execution and the like of commands are stored;
3. an extra data register group that is provided for each page of the flash memory and in which management data and the like of each page is stored;
4. a register address register in which addresses for specifying access positions to the registers of the above-described groups 1, 2 and 3; and
5. a command register in which control commands provided from the host device 2 are stored.

As shown in FIG. 11, the status register group includes five internal registers, that is, an INT register, a status register, a type register, a category register, and a cluster register. The values stored in the internal registers of the status register group are updated by the memory I/F controller 16. The internal registers of the status register group can be accessed from the host device 2 using READ_REG_TPC (which is one of TPCs and will be described later in detail). The access from the host device 2 is read-only. Each of the internal registers of the status register group can store bit values of eight bits and an address is set for each.

INT Register

The INT register is a register in which the operating state of the memory card 1 is set. The value in this INT register is updated by the memory I/F controller 16 in accordance with the result of an operation corresponding to a control command provided from the host device 2 to the memory card 1. The INT register is an eight-bit register, as shown in FIG. 12. In the INT register, the operating state is set at the least significant bit (D0) and three high-order bits (D5 to D7), of eight bits. The remaining bits are reserved.

The bit D7 of the INT register is a CED (command end) bit. The CED bit is a bit indicating the end of execution of a control command set by EX_SET_CMD_TPC or SET_CMD_TPC (which is one of TPCs and will be later described in detail). The end of execution in this case means the end of execution irrespective of whether the execution ended normally or ended by an error. The bit value of the CED bit is made invalid (0) by the memory I/F controller 16 when the control command based on EX_SET_CMD_TPC or SET_CMD_TPC is set or is in an initial state. The bit value of the CED bit is made valid (1) by the memory I/F controller 16 when execution of the control command based on EX_SET_CMD_TPC or SET_CMD_TPC ends.

The bit D6 of the INT register is an ERR (error) bit. The ERR bit is a bit indicating that an error occurred as a result of executing a memory access command (control command) and a security command (control command) set by EX_SET_CMD_TPC or SET_CMD_TPC. The bit value of the ERR bit is made value (1) by the memory I/F controller 16 when an error occurs. The bit value of the ERR bit is made invalid (0) by the memory I/F controller 16 when a control command is set by new EX_SET_CMD_TPC or SET_CMD_TPC or when the error state is canceled.

The bit D5 of the INT register is a BREQ/PRG (buffer request/progress) bit. The BREQ/PRG bit is a bit indicating the status of progress in the case an access request to access the data buffer circuit 14 to the host device 2, generated as a result of executing a memory access command (control command) and a security command (control command) set by EX_SET_CMD_TPC or SET_CMD_TPC, and internal erasure processing and formatting of the non-volatile semiconductor memory 17 are executed. For example, it is a bit indicating the existence of data write request to write data to the data buffer circuit 14 when a write command to the non-volatile semiconductor memory 17 is issued, a data read request to read data from the data buffer circuit 14 when a read command to read data from the non-volatile semiconductor memory 17 is issued, or a receiving request to receive security data. The bit value of the BREQ/PRG bit is made valid (1) by the memory I/F controller 16 when each request is generated. The bit value of the BREQ/PRG bit is made invalid (0) by the memory I/F controller 16 when an access based on a TPC by the host device 2 occurs in response to the request. The bit value of the BREQ/PRG bit is updated by the memory I/F controller 16 in accordance with the status of progress of formatting and erasure.

The bit D0 of the INT register is a CMDNK (command nack) bit. The CMDNK bit is a bit indicating that a command set by EX_SET_CMD_TPC or SET_CMD_TPC cannot be executed. The bit value is made valid (1) by the memory I/F controller 16 when the control command set by EX_SET_CMD_TPC or SET_CMD_TPC cannot be executed. The bit value is made invalid (0) when the control command set by EX_SET_CMD_TPC or SET_CMD_TPC can be executed.

The bits as described above are set in the INT register. Thus, as the bit values in the INT register are properly combined, operating states as shown in FIG. 13 can be expressed as the operating state of the memory card 1 in response to the last control command.

Specifically, if CED=1, ERR=0, BREQ/PRG=0, and CMDNK=0, these values indicate an operating state that execution of a given control command ended normally. If CED=1, ERR=1, BREQ/PRG=0, and CMDNK=0, these values indicate an operating state that execution of a given control command ended by an error. If CED=0, ERR=0, BREQ/PRG=1, and CMDNK=0, these values indicate an operating state that execution of a given control command is performed normally and that an access request is made to the host device 2. If CED=0, ERR=1, BREQ/PRG 1, and CMDNK=0, these values indicate an operating state that an error is generated in execution of a given control command and that an access request is made to the host device 2. If CED=0, ERR=0, BREQ/PRG=1, and CMDNK=0, these values indicate an operating state that a given control command is being executed. If CED=0, ERR=1, BREQ/PRG=0, and CMDNK=0, these values indicate an operating state that erasure of the non-volatile semiconductor memory 17 is being executed or formatting is being performed. If CED=1, ERR=0, BREQ/PRG 0, and CMDNK=1, these values indicate an operating state that a given control command is non-executable.

When a new control command is set by EX_SET_CMD_TPC or SET_CMD_TPC, the initial values of the bits in the INT register are restored by the memory I/F controller 16 (i.e., all the bit values are 0).

Relation Between INT Register and INT Signal

As described above, the values of the respective bits (CED, ERR, BREQ/PRG, CMDNK) in the INT register are reflected on the INT signal. In the state BS0, the parallel interface circuit 12 of the memory card 1 drives the respective data lines of the parallel data (DATA[3:0]) to a high level or a low level in accordance with the bit values (CED, ERR, BREQ/PRG, CMDNK) of the INT register. The following is the relation between the respective bits of the INT register and the respective lines of the parallel data.

DATA0:CED
DATA1:ERR
DATA2:BREQ/PRG
DATA3:CMDNK

The parallel interface circuit 12 constantly refers to the values in the INT register during the period when the state is BS0. If any of the bit values in the INT register is valid (1), the parallel interface circuit 12 drives the corresponding data line to a high level (1). If any of the bit values is invalid (0), the parallel interface circuit 1 drives the corresponding data line to a low level (0). During the period when the state is BS0, the host device 2 monitors the levels of the respective data lines of the parallel data (DATA[3:0]) and judges whether an interrupt request is issued from the memory card 1 or not. If an interrupt request is issued from the memory card 1, that is, if it is judged that one of the data lines is switched from a low level to a high level, the host device 2 detects the line that is at a high level and thus detects one of the operating state shown in FIG. 13. Then, the host device 2 performs processing corresponding to the detected operating state.

In the parameter register group, internal registers are provided, that is, a system parameter register, a data count/security parameter register, a data address/revision number register, a TPC parameter register, and a command parameter register, as shown in FIG. 14. The values stored in the internal registers in the parameter register group are updated by the host device 2 and these values are referred to when the memory I/F controller 16 executes a control command. The internal registers in the parameter register group can be accessed from the host device 2 using WRITE_REG_TPC and EX_SET_CMD_TPC (which is one of TPCs and will be later described in detail). In the internal registers in the parameter register group, an address is set every eight bits.

Data Count/Security Parameter Register

In the data count/security parameter register, the number of data that are necessary when executing a memory access command (control command) provided from the host device 2 to the memory card 1 is stored. For example, the data size of read data when reading out data from the non-volatile semiconductor memory 17 and the data size of write data when writing data to the non-volatile semiconductor memory 17 are set. Moreover, in the data count/security parameter register, various set values that are necessary when executing a security command (control command) is stored. The size of the data count/security parameter register is 16 bits, and two addresses are set for eight-bit units, respectively.

Data Address/Revision Number Register

In the data address/revision number register, an address on the non-volatile semiconductor memory 17 that is necessary when executing a memory access command (control command) provided from the host device 2 to the memory card 1 is stored. For example, a leading address of a read position when reading out data from the non-volatile semiconductor memory 17 or a leading address of a write position when writing data to the non-volatile semiconductor memory 17 is stored. Moreover, in the data address/revision number register, a revision number that is necessary when executing a security command (control command) is stored. The size of the data address/revision number register is 32 bits, and four addresses are set for eight-bit units, respectively.

The data count/security parameter register and the data address/revision number register are referred to when executing READ_DATA, READ_INFO, WRITE_DATA, WRITE_INFO and the like, of memory access commands (control commands). In accordance with WRITE_REG_TPC and EX_SET_CMD_TPC, data is written to the data count/security parameter register and the data address/revision number register. The contents of these control commands will be later described in detail.

The register address register is a register that presets a leading address and a data length of a register to be accessed when the host device 2 accesses the above-described status register group and parameter register group by using a TPC.

Data can be written to the above-described status register group and parameter register group, using WRITE_REG_TPC (which is one of TPCs and will be later described in detail). Data can be read out from the status register group and the parameter register group, using READ_REG_TPC (which is one of TPCs and will be later described in detail). However, these WRITE_REG_TPC and READ_REG_TPC do not include information specifying a register position, as a factor. Therefore, when the host device 1 accesses a register using WRITE_REG_TPC or READ_REG_TPC, an address and a data length are set for the status register group and the parameter register group. When WRITE_REG_TPC or READ_REG_TPC is given, the memory I/F controller 16 refers to the information stored in the register address register and performs processing corresponding to each command. A TPC for storing the register address and the data length in the register address register is SET_R_W_REG_ADRS_TPC, which will be later described in detail.

The command register is a register for storing control commands provided from the host device 2. In response to the control commands stored in the command register, the memory I/F controller 16 performs various operation control. A TPC for storing control commands to the command register is SET_CMD_TPC and EX_SET_CMD_TPC, which will be later described in detail.

TPCs (transfer protocol commands) will now be described.

TPCs are commands prescribed on the data transfer protocol of the present memory card 1 and host device 2. TPCs are used the host device 2 when accessing the register circuit 13 and the data buffer circuit 14 in the memory card 1. TPCs are transferred from the host device 2 to the memory card 1 at the timing when the bust state is BS1. The code contents of these TPCs and their specific operations will be described.

The following are exemplary TPCs.
READ_LONG_DATA_TPC
READ_SHORT_DATA_TPC
READ_REG_TPC
GET_INT_TPC
WRITE_LONG_DATA_TPC
WRITE_SHORT_DATA_TPC
WRITE_REG_TPC
SET_R_W_REG_ADRS_TPC
SET_CMD_TPC
EX_SET_CMD_TPC READ_LONG_DATA_TPC is a command for reading out data of 512 bytes from the data buffer circuit 14. That is, it is a command for transferring all the data stored in the data buffer circuit 14 to the host device 2. READ_LONG_DATA_TPC is a read-system command. Specifically, as READ_LONG_DATA_TPC is issued from the host device 2 to the memory card 1 in the state BS1, data of 512 bytes in the data buffer circuit 14 is transferred from the memory card 1 to the host device 2 in the state BS3.

READ_SHORT_DATA_TPC is a command for reading out data having a data length set by the TPC parameter register, from the data buffer circuit 14. That is, it is a command for transferring a predetermined quantity of data stored in the data buffer circuit 14 to the host device 2. READ_SHORT_DATA_TPC is a read-system command. Specifically, as READ_SHORT_DATA_TPC is issued from the host device 2 to the memory card 1 in the state BS1, data of a predetermined number of bytes in the data buffer circuit 14 is transferred from the memory card 1 to the host device 2 in the state BS3.

READ_REG_TPC is a command for reading out the value of a register having an address set therefor. The register having an address set therefor is each internal register of the status register group, the parameter register group, and the extra register group. The address position (leading address and data length) of the register from which reading is to be performed is the value stored in the register address register. In short, when referring to a value in a register, it is necessary to write the target address position to the register address register in advance. A TPC for writing the address position to the register address register is SET_R_W_REG_ADRS_TPC. READ_REG_TPC is a read-system command. Specifically, as READ_REG_TPC is issued from the host device 2 to the memory card 1 in the state BS1, data of a predetermined number of bits in the target register is transferred from the memory card 1 to the host device 2 in the state BS3.

GET_INT_TPC is a command for reading out the value (of eight bits) of the INT register, which is an internal register of the status register group. Unlike the above-described READ_REG_TPC, this GET_INT_TPC is for reading out the value of the INT register without storing the address position to the register address register. GET_INT_TPC is a read-system command. Specifically, as GET_INT_TPC is issued from the host device 2 to the memory card 1 in the state BS1, data of eight bits in the INT register is transferred from the memory card 1 to the host device 2 in the state BS3.

WRITE_LONG_DATA_TPC is a command for writing data of 512 bytes to the data buffer circuit 14. That is, it is a command for transferring all the data for the data buffer circuit 14 from the host device 2 to the memory card 1.

WRITE_LONG_DATA_TPC is a write-system command. Specifically, as WRITE_LONG_DATA_TPC is issued from the host device 2 to the memory card 1 in the state BS1, data of 512 bytes to be written to the data buffer circuit 14 is transferred from the host device 2 to the memory card 1 in the state BS2.

WRITE_SHORT_DATA_TPC is a command for writing data having a data length set by the TPC parameter register, to the data buffer circuit 14. That is, it is a command for transferring a predetermined quantity of data from the host device 2 into the data buffer circuit 14. WRITE_SHORT_DATA_TPC is a write-system command. Specifically, as WRITE_SHORT_DATA_TPC is issued from the host device 2 to the memory card 1 in the state BS1, data of a predetermined number of bytes to be written to the data buffer circuit 14 is transferred from the host device 2 to the memory card 1 in the state BS2.

WRITE_REG_TPC is a command for writing the value of a register having an address set therefor. The register having an address set therefor is each internal register of the status register group, the parameter register group, and the extra register group. However, the register to which a value can be written by the host device 2 is included in the parameter register group and the extra register group. The address position (leading address and data length) of the register to which writing is to be performed is the value stored in the register address register. In short, when writing a value into a register, it is necessary to write the target address position to the register address register in advance. A TPC for writing the address position to the register address register is SET_R_W_REG_ADRS_TPC. WRITE_REG_TPC is a write-system command. Specifically, as WRITE_REG_TPC is issued from the host device 2 to the memory card 1 in the state BS1, data to be written into the target register is transferred from the host device 2 to the memory card 1 in the state BS2.

SET_R_W_REG_ADRS_TPC is a command for storing the address position of a register to be accessed in accordance with READ_REG_TPC or WRITE_REG_TPC, into the register address register. SET_R_W_REG_ADRS_TPC is a write-system command. Specifically, as SET_R_W_REG_ADRS_TPC is issued from the host device 2 to the memory card 1 in the state BS1, data to be written to the register address register is transferred from the host device 2 to the memory card 1 in the state BS2.

SET_CMD_TPC is a command for storing a control command as an operation command to the memory I/F controller 16, into the command register. As a control command is stored in the command register in accordance with SET_CMD_TPC, the memory I/F controller 16 performs operation control corresponding to the control command. The contents of the operation include, for example, operation control for the memory, an operation to various functions except for the memory, an operation related to security of data, and so on. Depending on the contents of the operation based on the control command, the operation is performed with reference to the value stored in the parameter register. In this case, it is necessary to write the value to a predetermined internal register of the parameter register group in advance in a packet before issuing SET_CMD_TPC, using the above-described WRITE_REG_TPC. SET_CMD_TPC is a write-system command. Specifically, as SET_CMD_TPC is issued from the host device 2 to the memory card 1 in the state BS1, a code of a control command to be written to the command register is transferred from the host device 2 to the memory card 1 in the state BS2.

EX_SET_CMD_TPC is a command for storing data to the data count/security parameter register and the data address/revision number register and for storing a control command to the command register. When a memory access command is transferred as a control command in accordance with EX_SET_CMD_TPC, the data quantity of data to be accessed in the non-volatile semiconductor memory 17 is stored into the data count/security parameter register, and the data address in the non-volatile semiconductor memory 17 is stored into the data address/revision number register. When a security command is transferred as a control command in accordance with EX_SET_CMD_TPC, a parameter for security management is stored into the data count/security parameter register, and revision number for security management is stored into the data address/revision number register. When a control command is transferred in accordance with EX_SET_CMD_TPC, transfer data is stored to the data count/security parameter register and the data address/revision number register before the memory I/F controller 16 executes the control command.

EX_SET_CMD_TPC is a write-system command. Specifically, as EX_SET_CMD_TPC is issued from the host device 2 to the memory card 1 in the state BS1, a code of a control command or the like is transferred from the host device 2 to the memory card 1 in the state BS2.

The same data transfer operation as that of EX_SET_CMD_TPC can be also realized with SET_CMD_TPC. However, in the case of transferring a control command for operation control referring to a value stored in an internal register of the parameter register group, for example, in the case of transferring a control command such as READ_DATA, READ_INFO, WRITE_DATA, or WRITE_INFO, the data to be referred to must be transferred to the parameter register in advance. That is, SET_R_W_REG_ADRS_TPC and WRITE_REG_TPC must be transferred before the execution of SET_CMD_TPC.

On the other hand, when EX_SET_CMD_TPC is used, it is not necessary to store data in advance to the data count/security parameter register and the data address/revision number register, using WRITE_REG_TPC. In short, EX_SET_CMD_TPC can realize, with only one packet, the data transfer operation that would require three packets in the case of using SET_CMD_TPC.

Therefore, if a control command is transferred using EX_SET_CMD_TPC, a packet sequence for transferring SET_R_W_REG_ADRS_TPC and WRITE_REG_TPC need not be executed and high-speed processing can be realized.

Figure 15:
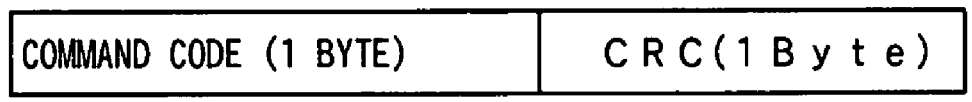
FIG. 15 is a view showing transfer data in the case of SET_CMD_TPC.

FIG. 15 shows a specific example of transfer data transferred from the host device 2 to the memory card 1 when SET_CMD_TPC is executed. FIG. 16 shows a specific example of transfer data transferred from the host device 2 to the memory card 1 when EX_SET_CMD_TPC is executed. The transfer data shown in FIGS. 15 and 16 are transferred in the state BS2.

Transfer data in the case SET_CMD_TPC is executed includes a command code of one byte and a CRC of two bytes. The one-byte command code is a code specifying a control command to be executed by the memory I/F controller 16. The command code is stored into the command register.

Transfer data in the case EX_SET_CMD_TPC is executed includes a command code of one byte, count/security parameter data of two bytes, address/revision number data of two bytes, and a CRC of two bytes. The count/security parameter data is data to be stored into the data count/security parameter register. The address/revision number data is data to be stored into the data address/revision number register.

As shown in FIGS. 15 and 16, the transfer data in the case of EX_SET_CMD_TPC has a longer data length than the transfer data in the case of SET_CMD_TPC. Therefore, when transferring a command code that can be executed without referring to the data count/security parameter register and the data address/revision number register, the host device 2 use a short packet by using SET_CMD_TPC instead of EX_SET_CMD_TPC. Therefore, as SET_CMD_TPC and EX_SET_CMD_TPC are set as a TPC command set and adaptively selected in accordance with a control command to be transferred, processing can be performed at a higher speed.

Control commands will now be described.

Control commands are operation control commands provided from the host device 2 to the memory I/F controller 16 of the memory card 1. A control command is stored into the command register in the memory card 1 from the host device 2 in accordance with SET_CMD_TPC or EX_SET_CMD_TPC. As the control command is stored in the command register, the memory I/F controller 16 executes operation control corresponding to that control command. Then, the memory I/F controller 16 properly updates each value in the INT register along with the execution of the operation control.

Control commands are classified into three types, that is, memory access commands, function commands, and security commands. Memory access commands are commands for accessing the non-volatile semiconductor memory 17 in the memory card 1. Function commands are commands for accessing various functions on the memory card 1. Security commands are commands for realizing necessary security functions for copyright protection.

The memory access commands include, for example, a command for reading out data from the non-volatile semiconductor memory 17 to the data buffer circuit 14, a command for writing data from the data buffer circuit 14 to the non-volatile semiconductor memory 17, a command for erasing data in the non-volatile semiconductor memory 17, and so on.

The function commands include, for example, a formatting command for restoring the state of this memory card 1 at the time of shipment from the factory, a sleep command for stopping the operation of the oscillator 18 of the memory card 1, and so on.

The security commands include, for example, a command for reading out ID proper to this memory card 1, a command for performing an operation with respect to the locking of a content key, a command for generating a random number, and so on.

FIG. 17 shows examples of the memory access commands.

As shown in FIG. 17, the memory access commands include READ_DATA, WRITE_DATA, READ_INFO, WRITE_INFO, READ_ATRB, STOP, ERASE, etc.

READ_DATA is a command for continuously reading out data from a designated address in a user area of the non-volatile semiconductor memory 17. When this READ_DATA is provided to the memory I/F controller 16, the memory I/F controller 16 refers to an address stored in the data address/revision number register and accesses this address in the non-volatile semiconductor memory 17, thus reading out data from this address. The read-out data is temporarily transferred to the data buffer circuit 14. When the data buffer circuit 14 is filled, that is, when data of 512 bytes is read out, the memory I/F controller 16 validates (1) the BREQ/PRG bit in the INT register and issues an interruption for transfer request to the host device 2. Then, as the data in the data buffer circuit 14 is read out by the host device 2, the memory I/F controller 16 transfers the subsequent data from the non-volatile semiconductor memory 17 to the data buffer circuit 14. The memory I/F controller 16 repeats the above-described processing until it reads out data corresponding to the quantity of data stored in the data count/security parameter register. As the data is read out to the end without any error, the memory I/F controller 16 validates (1) the CMD bit in the INT register and ends the processing. If an error occurs during the processing, the memory I/F controller 16 validates (1) the CMD bit in the INT register and also validates (1) the ERR bit to end the processing.

WRITE_DATA is a command for continuously writing the data stored in the data buffer circuit 14, starting at a designated address in the user area of the non-volatile semiconductor memory 17. When WRITE_DATA is provided to the memory I/F controller 16, the memory I/F controller 16 refers to an address stored in the data address/revision number register and accesses this address in this non-volatile semiconductor memory 17. Starting at this address, the memory I/F controller 16 sequentially write the data. The data to be written is the data stored in data buffer circuit 14. When the data buffer circuit 14 becomes empty, that is, data of 512 bytes is written, the memory I/F controller 16 validates (1) the BREQ/PRG bit in the INT register and issues an interruption for transfer request to the host device 2. As the subsequent data is written into the data buffer circuit 14 by the host device 2, the memory I/F controller 16 sequentially writes the data from the data buffer circuit 14 to the non-volatile semiconductor memory 17. The memory I/F controller 16 repeats the above-described processing until it writes data corresponding to the quantity of data stored in the data count/security parameter register. As the data is written to the end without any error, the memory I/F controller 16 validates (1) the CMD bit in the INT register and ends the processing. If an error occurs during the processing, the memory I/F controller 16 validates (1) the CMD bit in the INT register and also validates (1) the ERR bit to end the processing.

READ_INFO is a command for continuously reading out data from a designated address in an information book area of a system area in the non-volatile semiconductor memory 17. The processing procedure to be taken by the memory I/F controller 16 is the same as in the case of READ_DATA.

WRITE_INFO is a command for continuously writing data to a designated address in the information book area of the system area in the non-volatile semiconductor memory 17. The processing procedure to be taken by the memory I/F controller 16 is the same as in the case of WRITE_DATA.

READ_ATRB is a command for reading out attribute information from the non-volatile semiconductor memory 17. When this READ_ATRB is provided to the memory I/F controller 16, the memory I/F controller 16 reads out attribute information in the non-volatile semiconductor memory 17 and transfers the attribute information to the data buffer circuit 14.

STOP is a command for halfway ending execution of the processing of READ_DATA, WRITE_DATA, READ_INFO, WRITE_INFO, or READ_ATRB. When STOP is provided to the memory I/F controller 16, the memory I/F controller 16 stops execution of READ_DATA, WRITE_DATA, READ_INFO, WRITE_INFO, or READ_ATRB.

ERASE is a command for erasing data from a designated address in the user area. When ERASE is provided to the memory I/F controller 16, the memory I/F controller 16 refers to an address stored in the data address/revision number register and erases data corresponding to the quantity of data stored in the data count/security parameter register from the non-volatile semiconductor memory 17, starting at the storage position indicated by the address.

The removable memory card to which the present invention is applied, and the host device using this memory card as an external storage medium are described above. The present invention is not limited to such a memory card. For example, the present invention may also be applied to a camera device as an external connection device of the host device. In this case, the memory I/F controller 16 performs operation control of the camera device, and commands for camera control are set as control commands.

While the invention has been described in accordance with a certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

INDUSTRIAL APPLICABILITY

With the external connection device and the host device according to the present invention, when the state of a bus state signal is a state of accepting an interruption from the external connection device to the host device, information indicating the content of an element of interruption generated on the basis of an operation control command provided from the host device to the controller of the external connection device is transferred as an interrupt signal from the external connection device to the host device via the data bus. Therefore, referring to the interrupt signal, the host device can judge the element of interruption generated by the external connection device. The host device can immediately respond to the element of interruption without confirming the element of interruption through communication with the external connection device after receiving the interrupt signal. Therefore, with the external connection device and the host device according to the present invention, a data transfer sequence can be reduced when an interrupt request is issued from the external connection device side.

The invention claimed is:

1. An external connection device to be connected to a host device, the external connection device comprising:
    data communication means for performing bidirectional communication of transmission data to and from the host device via a data bus;
    bus state signal receiving means for receiving a bus state signal indicating the state of the data bus from the host device;
    a controller for controlling the operation of this device in accordance with an operation control command included in the transmission data; and
    a register in which operating state information is stored, wherein when the state of the bus state signal is a state of accepting interruption from this device to the host device, the data communication means sends, to the host device via the data bus, information indicating the content of an element of interruption generated on the basis of the operation control command provided to the controller from the host device.
    wherein the controller executes the operation control command provided from the host device and updates the operating state information in the register on the basis of an operating state of this device corresponding to the execution, and
    when the state of the bus state signal is a state of accepting interruption from this device to the host device, the data communication means sends the operating state information stored in the register to the host device via the data bus, and
    wherein the operating state information includes information of one bit (CED bit) indicating an operating state in which execution of the operation control command ended, information of one bit (ERR bit) indicating an operating state in which an error occurred in execution of the operation control command, information of one bit (BREQ/PRG bit) indicating an operating state of accepting access from the host device to this device as a result of executing the operation control command, and information of one bit (CMDNK bit) indicating an operating state in which the operation control command is non-executable.

2. The external connection device as claimed in claim 1, wherein the data bus transmits parallel data of at least four bits, and
    the data communication means sends the CED bit, the ERR bit, the BREQ/PRG bit and the CMDNK bit as parallel data of four bits to the host device via the data bus.

3. The external connection device as claimed in claim 2, wherein the data communication means transmits the CED bit, the ERR bit, the BREQ/PRG bit and the CMDNK bit asynchronously with a transmission clock of the data bus provided from the host device.

4. The external connection device as claimed in claim 2, wherein when execution of the operation control command ends normally, the controller validates the CED bit, invalidates the ERR bit, invalidates the BREQ/PRG bit, and invalidates the CMDNK bit.

5. The external connection device as claimed in claim 2, wherein when an error occurs in execution of the operation control command, the controller validates the CED bit, validates the ERR bit, invalidates the BREQ/PRG bit, and invalidates the CMDNK bit.

6. The external connection device as claimed in claim 2, wherein when execution of the operation control command is performed normally and access from the host device to this device is to be accepted, the controller invalidates the CED bit, invalidates the ERR bit, validates the BREQ/PRG bit, and invalidates the CMDNK bit.

7. The external connection device as claimed in claim 2, wherein when an error occurs in execution of the operation control command and access from the host device to this device is to be accepted, the controller invalidates the CED bit, validates the ERR bit, validates the BREQ/PRG bit, and invalidates the CMDNK bit.

8. The external connection device as claimed in claim 2, wherein during execution of the operation control command, the controller invalidates the CED bit, invalidates, the ERR bit, invalidates the BREQ/PRG bit, and invalidates the CMDNK bit.

9. The external connection device as claimed in claim 2, wherein when the operation control command is non-executable, the controller validates the CED bit, invalidates the ERR bit, invalidates the BREQ/PRG bit, and validates the CMDNK bit.

10. A host device to which an external connection device is connected, the host device comprising:
data communication means for performing bidirectional communication of transmission data to and from the external connection device via a data bus;
bus state signal sending means for sending a bus state signal indicating the state of the data bus to the external connection device; and
a controller for issuing a control command for controlling an operation of the external connection device, the control command being included in the transmission data;
wherein when the state of the bus state signal is a state of accepting interruption from the external connection device to this device, the data communication means receives, from the external connection device via the data bus, information indicating the content of an element of interruption generated on the basis of the operation control command provided from this device to the external connection device,
wherein the data communication means receives operating state information indicating an operating state of this device when operation control is performed on the basis of an operation control command provided from the host device to the controller, as information indicating the content of an element of interruption, from the external connection device via the data bus, and
wherein the operating state information includes information of one bit (CED bit) indicating an operating state in which execution of the operation control command ended, information of one bit (ERR bit) indicating an operating state in which an error occurred in execution of the operation control command, information of one bit (BREQ/PRG bit) indicating an operating state of accepting access from the host device to this device as a result of executing the operation control command, and information of one bit (CMDNK bit) indicating an operating state in which the operation control command is non-executable.

11. The host device as claimed in claim 10, wherein the data bus transmits parallel data of at least four bits, and the data communication means receives the CED bit, the ERR bit, the BREQ/PRG bit and the CMDNK bit as parallel data of four bits from the external connection device via the data bus.

12. The host device as claimed in claim 11, wherein the data communication means receives the CED bit, the ERR bit, the BREQ/PRG bit and the CMDNK bit asynchronously with a transmission clock of the data bus provided from this device to the external connection device.

13. The host device as claimed in claim 11, wherein when the CED bit is valid, the ERR bit is invalid, the BREQ/PRG bit is invalid, and the CMDNK bit is invalid, the controller judges that execution of the operation control command ended normally.

14. The host device as claimed in claim 11, wherein when the CED bit is valid, the ERR bit is valid, the BREQ/PRG bit is invalid, and the CMDNK bit is invalid, the controller judges that an error occurred in execution of the operation control command.

15. The host device as claimed in claim 11, wherein when the CED bit is invalid, the ERR bit is invalid, the BREQ/PRG bit is valid, and the CMDNK bit is invalid, the controller judges that execution of the operation control command is performed normally and that access from this device to the external connection device is accepted.

16. The host device as claimed in claim 11, wherein when the CED bit is invalid, the ERR bit valid, the BREQ/PRG bit is valid, and the CMDNK bit is invalid, the controller judges that an error occurred in execution of the operation control command and that access from this device to the external connection device is accepted.

17. The host device as claimed in claim 11, wherein the CED bit is invalid, the ERR bit is invalid, the BREQ/PRG bit is invalid, and the CMDNK bit is invalid, the controller judges that the operation control command is being executed.

18. The host device as claimed in claim 11, wherein the CED bit is valid, the ERR bit is invalid, the BREQ/PRG bit is invalid, and the CMDNK bit is valid, the controller judges that the operation control command is non-executable.

* * * * *

UNITED STATES PATENT AND TRADEMARK OFFICE
CERTIFICATE OF CORRECTION

PATENT NO. : 7,051,128 B2 Page 1 of 1
APPLICATION NO. : 10/474915
DATED : May 23, 2006
INVENTOR(S) : Hideaki Bando It is certified that error appears in the above-identified patent and that said Letters Patent is hereby corrected as shown below:

Column 1, line 13 change "device and host device" to --devices and host devices --;
Column 1, line 42 delete "of" after "notifies";
Column 1, line 46 change "enable" to --enables--;
Column 1, line 50 change "device and host device" to --devices and host devices --;
Column 1, line 60 change "to be connection" to --to be connected--;
Column 6, line 1 change "judges" to --judge--;
Column 10, line 35 change "each page is stored" to --each page are stored--;
Column 13, line 2 change "is stored" to --are stored--;
Column 17, line 10 change "use" to --uses--;
Column 18, line 25 change "write" to --writes--;
Column 19, line 53 change "bidirectional" to --bi-directional--;
Column 20, line 63 delete "," after "invalidates";
Column 21, line 6 change "bidirectional" to --bi-directional--;
Column 22, line 34 change "wherein the" to --wherein when the--; and
Column 22, line 39 change "wherein the" to --wherein when the--.

Signed and Sealed this

Twenty-seventh Day of March, 2007

JON W. DUDAS
*Director of the United States Patent and Trademark Office*